United States Patent
Murray

(10) Patent No.: US 11,171,810 B1
(45) Date of Patent: Nov. 9, 2021

(54) MISCONFIGURED UPLINK IDENTIFICATION

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/065,271

(22) Filed: Oct. 7, 2020

(51) Int. Cl.
*G06F 15/173* (2006.01)
*H04L 12/46* (2006.01)
*H04L 29/12* (2006.01)

(52) U.S. Cl.
CPC ...... *H04L 12/4645* (2013.01); *H04L 12/4679* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 3,871,151 A | * | 3/1975 | Der Estephanian | E06B 9/01 52/507 |
| 5,111,497 A | * | 5/1992 | Bliven | H01R 13/443 361/679.32 |
| 5,195,125 A | * | 3/1993 | Bliven | H01R 13/443 379/29.01 |
| 5,404,401 A | * | 4/1995 | Bliven | H01R 13/443 361/641 |
| 5,598,455 A | * | 1/1997 | Bliven | H01R 13/443 379/22.04 |
| 10,595,328 B2 | | 3/2020 | Soriaga et al. | |

(Continued)

FOREIGN PATENT DOCUMENTS

CN 104394034 A 3/2015

OTHER PUBLICATIONS

Cisco, "VLAN Mismatch Alerts for Meraki Switches," Meraki, Cisco Documentation, 2018, 3 pages.

(Continued)

*Primary Examiner* — Phyllis A Book
(74) *Attorney, Agent, or Firm* — Hewlett Packard Enterprise Patent Department

(57) ABSTRACT

Techniques for detecting misconfiguration of an uplink or an external network device connected with the uplink is disclosed. In an aspect, a Frame Link Module (FLM) in a frame belonging to a group of frames connected in a ring network, may determine that an uplink of the FLM is configured in a management mode. The FLM may determine, based on a system description associated with a Link Layer Discovery Protocol (LLDP) packet, whether the uplink is connected to a network device in an external network. Based on Virtual Local Area Network (VLAN) traffic being dropped, it may be determined that VLAN configuration of one of the uplink and the network device is incompatible for operation in the management mode. The uplink with incompatible VLAN configuration or the uplink connected with a network switch having incompatible VLAN configuration may be removed from a group of uplinks available for selection as an active uplink for the frames.

20 Claims, 5 Drawing Sheets

(56) References Cited

U.S. PATENT DOCUMENTS

| | | | | |
|---|---|---|---|---|
| 2006/0015643 | A1* | 1/2006 | Orava | H04L 45/00 |
| | | | | 709/238 |
| 2008/0013547 | A1* | 1/2008 | Kiessig | H04L 12/66 |
| | | | | 370/395.53 |
| 2013/0201979 | A1* | 8/2013 | Iyer | H04W 84/12 |
| | | | | 370/338 |
| 2014/0153441 | A1* | 6/2014 | Frey | H04L 49/354 |
| | | | | 370/255 |
| 2019/0028299 | A1* | 1/2019 | Murray | H04L 12/423 |
| 2019/0313400 | A1 | 10/2019 | Farag et al. | |

OTHER PUBLICATIONS

Oracle®, "Troubleshooting Network Administration Issues in Oracle® Solaris 11.2", Part No. E36815, Jul. 2014, pp. 1-52.
Rentschler et al., "Convenient Fault Diagnosis with LLDP," Control Engineering Europe, Oct. 2010, 2 pages.

* cited by examiner

MISCONFIGURED UPLINK IDENTIFICATION

BACKGROUND

In the field of scalable compute resources, network connectivity between nodes, blades, or frames of adjacent network modules may represent a primary communication path for sharing data between those nodes. The data may represent inputs to compute process (e.g., data or applications), outputs of compute resources (e.g., compute results), communications to coordinate distributed processes, and other types of data. In some architectures, nodes of network modules within a blade server, cluster, or frame may be connected to each other using redundant frame link modules (FLMs) in each frame (e.g., node).

A group of frames may be typically configured in a ring network topology, also referred to as a ring network. The ring network may be a loop where each node communicates to exactly one upstream and one downstream neighbor so that all communications pass around the ring topology. To control data traffic and prevent network loops, some ring network implementations may designate one FLM as a ring owner. Each of the FLMs may have an uplink port, also referred to as an uplink, for connecting to external network resources, such as with external switches in customer networks.

When configured in the ring network, a group of frames in the ring may only have a single active uplink to external network resources. The single active uplink may exchange data between the frames in the ring and the external network resources. Each of the uplinks from the group of frames may send messages to the ring owner informing that they are available to be selected as the active uplink. The uplinks which are available for selection as the active uplink may be set in a management mode. Thus, the uplinks configured in the management mode may form a group of uplinks from which the ring owner can designate one uplink as an active uplink for the group of frames. To work properly in the management mode, the active uplink should be connected to an external network resource, such as with a network switch in a customer network, and the active uplink and the network switch should be properly configured. Improper hardware connections with the active uplink or misconfiguration of the active uplink or the external switch may result in loss of access to compute resources in the frames.

BRIEF DESCRIPTION OF THE DRAWINGS

Some implementations of the present disclosure are described with respect to the following figures.

Figure 1:
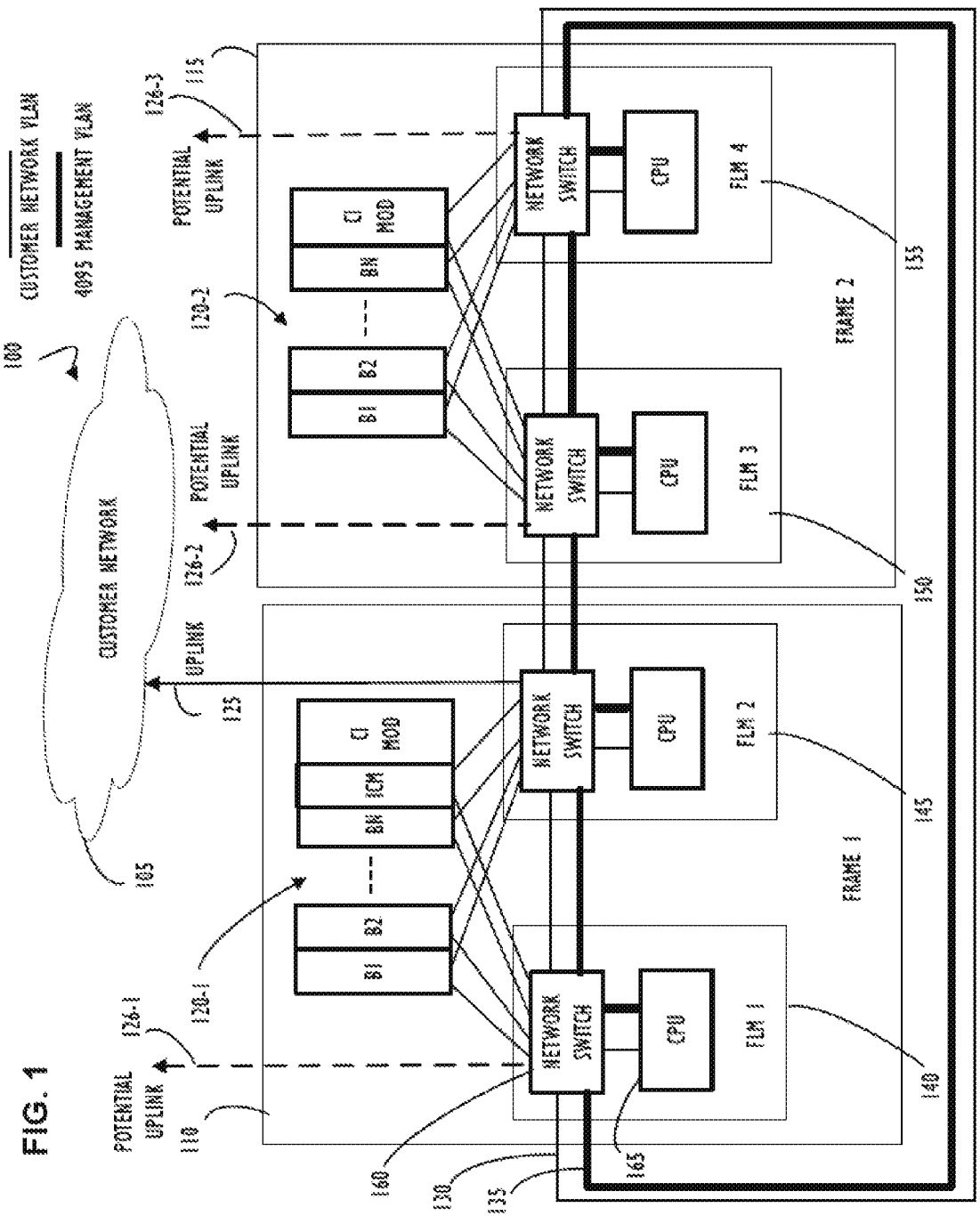
FIG. 1 is a block diagram of an example computer infrastructure including multiple frame scalable compute resources, a customer VLAN, and a management VLAN for misconfigured uplink identification.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Network security, fault tolerance, and performance represent important considerations for computer networks. Fault tolerance includes ensuring that connected network devices are configured properly and are not allowed to affect other systems when an individual device exhibits failure or degradation. In some scalable compute resource implementations, network modules, also called frame link modules (FLMs), provide access to compute modules in each frame and therefore network efficiency may have an increased importance. That is, a scalable compute resource may rely more heavily on efficient network communication between nodes than a traditional distributed system. The scalable compute resource may be architected as a Composable Infrastructure (CI) which provides compute, storage, and network/fabric resources. A frame is a primary unit of the scalable compute resource with embedded management and scalable links that may be expanded to enhance the capabilities of the scalable compute resource. The Frame is the base infrastructure that pools resources of compute, storage, fabric, cooling, power and scalability. A system administrator can manage, assemble and scale resources on the scalable compute resource.

Multiple frames may also be configured as a scalable compute resource. Each frame may contain multiple compute blades and provide an uplink service to an external network so that compute blade resources may be accessed and serviced externally. The external network refers to a network which is outside the frame or the group of frames which sometimes is part of a management Virtual Local Area Network (VLAN). The external network typically refers to a user/customer network from where a network administrator/user may deploy, service, and maintain the compute resources in the frames, A ring network topology is typical for a group of frames. Each frame in the ring is typically configured with redundant modules called frame link modules (FLMs) that contain a processing resource, such as a Central Processing Unit (CPU), and a switch which provide redundancy for a network connection to the compute blades. Within a given frame, one FLM is active and the other is standby. Each FLM may send commands to enable/disable links on other network switches using remote sockets. Each FLM may also reboot the other FLM in the same frame (referred to as a neighbor FLM). Every FLM in the ring has the capability to provide the uplink to the external network but only one uplink is designated as an active uplink for the entire group of frames in the ring. An FLM selected as a ring "owner" may be responsible for designating which FLM may enable its uplink to the external network to provide ring connectivity.

Generally, for providing access and connectivity to the frames in the group, the uplinks are connected to an external network resource, such as a network switch in an external network and are set to operate in a management mode. In an example, the external network refers to a Local Area Network (LAN) outside the ring network of the group of frames, Examples of the external network includes a customer network. The management mode may refer to a mode of operation of an uplink in which the primary functionality of the uplink is to exchange data between the frames in the ring and external network resources. Since, the uplinks are primarily used for interacting with the external network, the management mode may also be a default mode for the uplinks. Such uplinks connected to external network resources may be programmed to receive untagged traffic and to drop all tagged VLAN packets. A switch port configured as an untagged port may receive and forward VLAN packets without any VLAN ID tagged to their header. VLAN packets bearing a VLAN tag in their header are dropped by the untagged port. A switch port which is configured as a tagged port may receive and forward VLAN packets with a VLAN ID tagged to their headers. A tagged port may be configured to allow VLAN packets from multiple VLANs and forward them to their destination based on their respective VLAN tags. In order for a tagged port to service a VLAN packet, the VLAN from which the VLAN packet has originated should be tagged to be allowed at the receiving tagged port.

In some aspects, the uplinks may also be connected to hardware components installed within the frame, such as with Interconnect Modules (ICM) to exchange multimedia data. Such uplinks connected to internal hardware components are configured to be set in a specific mode associated with the hardware component to which they are connected and are removed from the management mode. These uplinks connected to internal hardware components are not considered as a candidate for selection as an active uplink, since they cannot be used for exchanging information with the external network due to lack of a physical connection with external network resources.

A customer may accidentally reset settings of the FLM or reset to factory settings which may cause configuration information associated with the uplink of the FLM to be removed. The configuration of an uplink connected to an internal hardware component may be removed due to an accidental reset and the uplink may revert to a default management mode. The uplink in the management mode may also be available for selection as an active uplink. Since the uplink is now in the management mode and has a potential of being selected as the active uplink, the uplink should be connected with external network resources, such as with a network switch in an external network. However, after the reset, the customer may forget to connect the physical cable connection from the uplink to the network switch in the external network. If such an uplink is selected as the single active uplink, failure in the uplink due to the above issue may result in loss of access to the frames in the ring and its compute resources.

Further, a customer may accidently configure the port of the external switch to which the uplink is connected for tagged VLANs while the uplink is typically configured for untagged traffic. Consequently, the connection between the uplink and the port of the external switch may have a link but no traffic may be received except for Link Layer Discovery Protocol (LLDP) packets, since the uplink configured for untagged traffic may drop any tagged VLAN packets that may be received from the port of the external switch. Similarly, the uplink may also be mistakenly configured to receive tagged VLAN packets while the external switch port is configured for untagged traffic. Consequently, traffic may not be exchanged between the external switch and the uplink, Yet further, both the external switch and the uplink may be configured to receive tagged VLAN packets but may be allowed on different VLANs. If the uplink from any of the above cases is selected as the single active uplink, failure in the uplink due to the above issues may result in a loss of connectivity between the external network and the compute resources in the ring. Thus, the compute resources may not be accessible and may result in performance degradation. Accordingly, disclosed techniques represent an improvement for detecting and addressing misconfigurations of the uplink in a FLM from a group of frames connected in a ring network.

The systems and methods described herein discuss techniques in which LLDP packets received at the uplink and drops of VLAN packets at the uplink are monitored to identify incorrect hardware connection with the uplink or incompatible VLAN configuration in the uplink or a switch port in an external network. If either is identified, the uplink may be removed from a group of uplinks available for selection as the active uplink, Thus, the incorrectly connected uplink or uplink with incompatible VLAN configuration is prevented from being selected as the active uplink, consequently reducing/eliminating chances of loss of connectivity to the frames in the ring network, Thus, downtime due to loss of access to the compute resources may be reduced and performance may be enhanced.

A method for detecting a misconfiguration in the uplink and/or a network device (such as a network switch) in an external network connected to the uplink is disclosed. The method includes determining, by a FLM in a frame belonging to a group of frames connected in a ring network, that an uplink port of the FLM is configured in a management mode. Responsive to determining that the uplink port is configured in the management mode, the method includes, determining, by the FLM and based on a system description associated with a LLDP packet received at the uplink port, whether the uplink port is connected to a network device in an external network. The method includes determining, by the FLM and based on VLAN traffic received at the uplink port being dropped, that VLAN configuration of one of the uplink port and the network device is incompatible for operation in the management mode. The method includes, responsive to determining that the uplink port is not connected to the network device or the VLAN configuration of one of the uplink port and the network device is incompatible for operation in the management mode, removing, by the FLM, the uplink port from a group of uplink ports available for selection as an active uplink port for the group of frames. Thus, the uplink port in the management mode, which is connected to incorrect hardware, or has VLAN configuration incompatible for operation in the management mode, or is connected to the network device having VLAN configuration incompatible for operation in the management mode, is prevented from being selected as the active uplink. Hence, chances of failures in connectivity between the external network and compute resources of the frame is reduced/eliminated.

Referring to FIG. 1, an example computer infrastructure 100 is illustrated. In this example, customer network 105 is connected to a set of frames (represented by frame 1 (110), and frame 2 (115)). Of course, more than two frames may be present, but for simplicity of this disclosure only two are shown in this example. As indicated by arrow 120-1, frame 1 may be configured with a set of blades (B1, B2, . . . BN), an Interconnect Module (ICM), and a Composable Infrastructure (CI) module. Similarly, arrow 120-2 indicates that frame 2 may be configured in a like manner, except frame 2 does not illustrate an ICM within the frame. Frame 1 further includes two Frame Link Modules (FLMs), namely FLM 1 (140) and FLM 2 (145) (also referred to as a Network Module). Frame 2 also includes two FLMs, namely FLM 3 (150) and FLM 4 (155). These FLMs provide connectivity for the compute resources represented by the respective blades within their frame. Each of the blades is shown with a network connection to a network switch (referred to as network switch 160 for FLM 1), respectively disposed within each individual FLM (e.g., FLM 1 (140) through FLM 4 (155)). Each FLM further includes a CPU (referred to as CPU 165 for FLM 1) to facilitate configuration, monitoring, and maintenance of a corresponding network switch (referred to as network switch 160 for FLM 1). Thus, each frame with an FLM may represent a network node in a ring network and may comprise a processor, an uplink port to send and receive messages in an external network, and a memory coupled to the processor and the memory storing instructions executable by the processor.

Connectivity from a set of frames to a customer network is typically provided by a single active uplink 125 from one of the plurality of network switches that exist across the multiple FLMs of a group of connected frames. That is, all communications external to the group of connected frames passes through uplink 125. Please note that an "uplink," as used herein, may also be referred to as a "management port" or an "uplink port". The uplink 125 is configured in a management mode, where the uplink 125 is set to exchange traffic with the customer network 105. The management mode is indicative of a mode of operation of the uplink in which the uplink is connected to an external network, such as the customer network 105, and the uplink can exchange data traffic with the external network. Typically, the uplink 125 is connected with a port of a network switch (not shown) in the customer network 105. Both the uplink 125 and the port of the network switch in the customer network should be configured to receive untagged traffic and drop tagged VLAN traffic for operation in the management mode.

Other potential uplinks 126-1, 126-2, and 126-3 are illustrated to be available (e.g., if needed as a result of failure to uplink 125) from other network switches. Although not illustrated in FIG. 1, in some examples, one or more of the potential uplinks 126-1, 126-2, and 126-3 may be connected with the ICM. The ICM connects components installed in device bays to various data center fabrics, enabling the facility to receive, process, and forward data to the destination component. The uplinks connected to the ICM may exchange multimedia traffic with other hardware components installed within the frame. The uplinks connected to the ICM may be set in a specific mode indicative of the other hardware component with which it is connected. Such uplinks connected to the ICM has no physical cable connection to the external network, such as the customer network 105, and should not be selected as the active uplink. Thus, such uplinks are removed from a group of uplinks that are available to be selected as the active uplink.

As further illustrated in computer infrastructure 100, customer network VLAN 130 connects each of the network switches 160 in an ethernet ring topology network and extends to the customer network 105 (e.g., includes VLANS 1-4094). A second ring network, 4095 management VLAN 135, is also shown as an isolated network in computer infrastructure 100. 4095 management VLAN 135 is shown in a bolder line than customer network VLAN 130 and also connects each of the network switches 160. Note, in a proper configuration of a group of frames, each network switch will be directly connected to each neighboring switch (either in the same frame or an adjacent frame) and no intervening network devices are present.

A virtual LAN (VLAN) refers to a broadcast domain that is partitioned and isolated (i.e., logically isolated) in a computer network at the data link layer (OSI layer 2). LAN is the abbreviation for local area network and when used in the context of a VLAN, "virtual" refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4095 management VLAN 135 in computer infrastructure 100.

Figure 2:
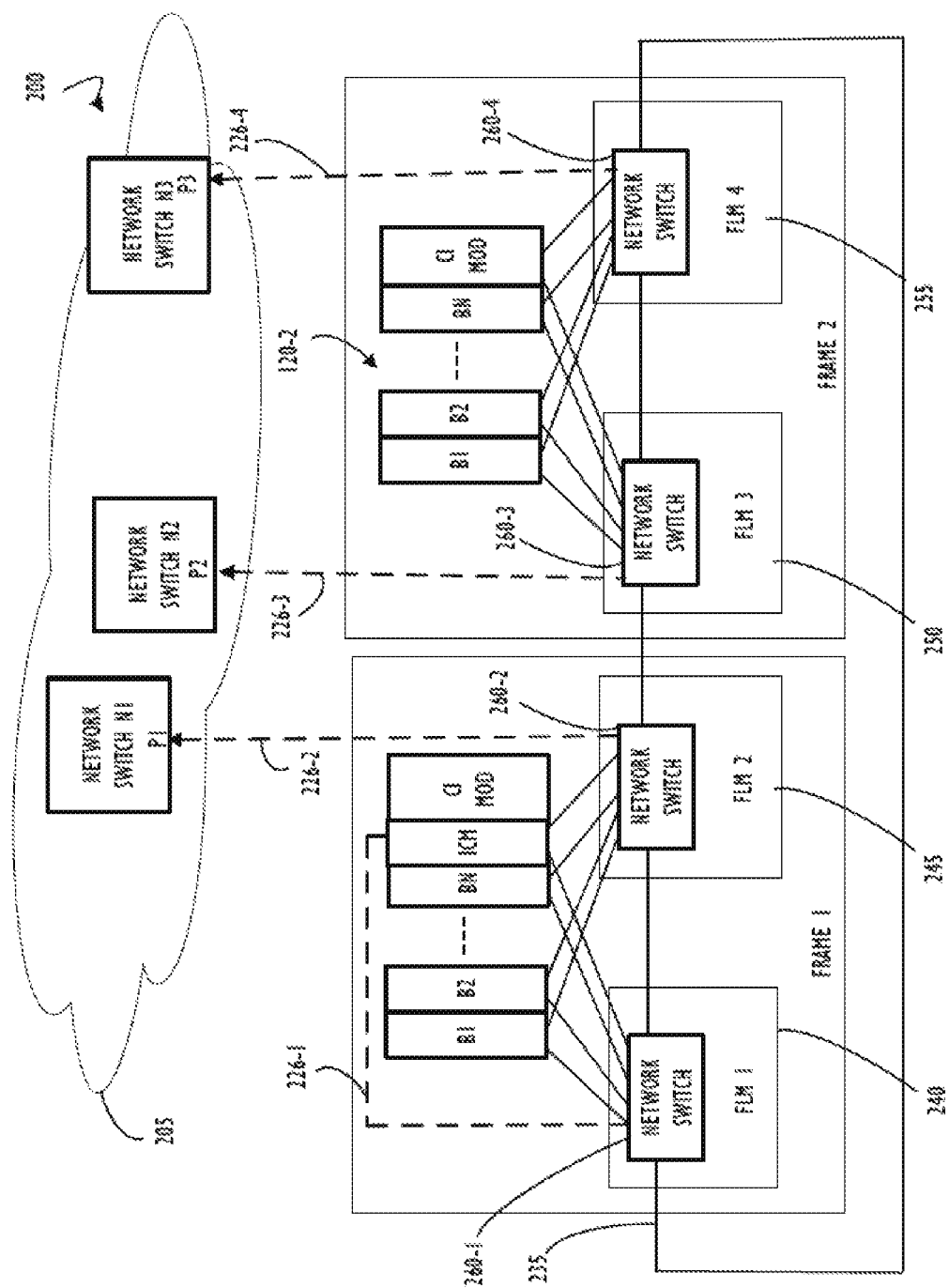
FIG. 2 is a block diagram of an example computer infrastructure including multiple frame scalable compute resources with some of its uplinks connected to network devices in an external network.

Referring now to FIG. 2, a different view of FIG. 1 is presented as computer infrastructure 200 with certain elements removed for clarity of discussion. Like in FIG. 1, computer infrastructure 200 illustrates four FLMs, namely FLM 1 (240), FLM 2 (245), FLM 3 (250), and FLM 4 (255). Also, each FLM is illustrated to include a network switch 260-1 to 260-4, respectively coupled to a respective CPU (not illustrated in FIG. 2). As further illustrated in FIG. 2, each network switch 260-1 to 260-4, collectively also referred to as network switches 260, is shown to have a left and a right link port (i.e., at least two ports) that connect to other network modules (240, 245, 250, and 255). As in FIG. 1, it may be desirable for the left and right link ports to connect directly to a next upstream and downstream network module within the ring topology and not have any intervening devices between network modules (240, 245, 250, and 255). As in FIG. 1, frame 1 may be configured with a set of blades (B1, B2, ... BN), an Interconnect Module (ICM), and a Composable Infrastructure (CI) module. Frame 2 may be configured in a like manner, except, frame 2 does not illustrate an ICM within the frame.

Each of the network switches 260 has an uplink port. As shown in FIG. 2, the uplink 226-1 of network switch 260-1 is connected to an ICM within the frame 1. Uplink 226-2 of network switch 260-1 is connected to a port P1 of a network switch N1 in a customer network 205. Similarly, uplinks 226-3 and 226-4 are connected to ports P2 and P3 of the network switches N2 and N3 deployed in the customer network 205. The customer network 205 is an external network to which the group of frames may be connected through a single active uplink so that compute blade resources may be accessed and serviced externally. In the illustration of FIG. 2, the single active uplink is not yet selected by an owner FLM from the group of frames in the ring topology network. The owner FLM may be responsible for designating which FLM may enable its uplink to the external network to provide ring connectivity. If the uplink selected by the owner FLM is subject to a failure or losses connectivity, the owner FLM may designate another uplink from a group of available uplinks, as the single active uplink. In an aspect, all FLMs in the ring that have an uplink port connected will send a message to the owner stating they have an uplink and it may be used as the active (e.g., register with the owner FLM). The contents of this message may contain the MAC address of the FLM with the uplink and the MAC address of the other FLM in the frame (i.e., its neighbor). The owner FLM may save the uplink messages in a registration table and request one FLM to enable its uplink and become active and the other uplinks in the table will be designated as standby uplinks. The FLM with the active uplink may send status messages to the owner FLM stating that its link is active. Alternatively, if the cable is unplugged or there is a failure in the active FLM, the FLM may send a message stating the uplink is inactive and the owner FLM may then select, for aspect from the registration table, one of the standby uplinks to become active.

Consider that FLM 4 is selected as the owner FLM and uplinks 226-1 to 226-4 are by default configured in a management mode. In an aspect, a network administrator may perform a factory reset rendering the configuration of the FLMs 1 to 4 to be reset and as a result all the uplinks 226 may be configured to operate in the management mode. Each of the FLMs 1 to 4 in the ring that have an uplink port connected may send a message to the owner FLM, i.e., FLM 4, stating they have an uplink and it may be used as the active uplink (e.g., register with the owner FLM), The owner FLM 4 may save the uplink messages in a registration table and request one FLM to enable its uplink and become active and the other uplinks in the table will be designated as standby uplinks.

Prior to establishing one of the uplinks as the single active uplink, it may be determined according to the techniques of the present disclosure whether the uplink is correctly configured for operation as the single active uplink. Although, the below description is elaborated with reference to FLM 1 and uplink port 226-1, the described method may apply mutatis mutandis to other FLMs, namely FLMs 2 to 4, and uplinks 226-2 to 226-4. The uplink 226-1 is checked for presence of an active link status. In an aspect, it is checked whether an uplink of the FLM is connected via a physical cable connection with a port of an external network device. Such an FLM with its uplink connected with the external network device may send status messages to the owner FLM stating that its uplink has an active link status. Alternatively, if the cable is unplugged or there is a failure in the active uplink, the FLM may send a message stating the uplink is inactive. In response to determining that the uplink port 226-1 has an active link status to exchange messages with the external network device, the FLM 1 in frame 1 belonging to the group of frames connected in the ring network determines that the uplink port 226-1 is configured in the management mode. In an aspect, the FLM 1 may check configuration information of the uplink port 226-1 to identify that the uplink 226-1 is configured in the management mode. Note, although the uplink 226-1 is configured in the management mode, it is incorrectly connected to an ICM, whereas, to ensure proper operation of the uplink 226-1 in the management mode, it should have been connected to a network switch in the external network, such as the customer network 205.

In response to determining that the uplink port 226-1 is in the management mode, the FLM 1 may check whether a Link Layer Discovery Protocol (LLDP) packet is received at the uplink port 226-1. If an LLDP packet is received at the uplink port 226-1, the FLM 1 may analyze the LLDP packet. In an aspect, a system description may be present in the LLDP packet which may indicate a source device from which the LLDP packet has originated. Based on analysis of the system description associated with the LLDP packet, the source device of the LLDP packet may be identified. Thus, the FLM 1 may determine that the uplink port 226-1 is connected to the source device, i.e., the ICM in this case. Therefore, using the system description of the LLDP packet received at the uplink port, the FLM may determine whether the uplink port is connected to a network device in an external network. Thus, in a similar manner as described above, it may be determined that the uplink port 226-2 is connected to port P1 of network switch N1, uplink port 226-3 is connected to port P2 of network switch N2, and uplink port 226-4 is connected to port P3 of network switch N2.

In an aspect, in respect of uplink 226-1, responsive to determining that the uplink port 226-1 is not connected to a network device, such as a network switch, in an external network, the FLM 1 determines that the uplink 226-1 is connected to incorrect hardware equipment for operation in the management mode. Thus, the FLM 1 may identify that there is an error or failure of operation in the uplink 226-1 and the FLM 1 may send a message, to the owner FLM 4, stating the uplink 226-1 is inactive. The owner FLM 4, responsive to receiving the message from the FLM 1 that the uplink 226-1 is inactive, may remove the uplink port 226-1 from a group of uplink ports available for selection as an active uplink port for the group of frames 1 and 2. In an aspect, information of the uplink 226-1 may be removed from the registration table from which the owner FLM 4 selects the single active uplink. In an aspect, the owner FLM 4 may then select from the registration table one of the standby uplinks 226-2 to 226-4 as the single active uplink. Consequently, the uplink 226-1 wrongly connected to incorrect hardware is prevented from being selected as the single active uplink.

Likewise, in another aspect with respect to uplink 226-2, the FLM 2 may check whether the uplink port 226-2 has an active link status to exchange messages with an external network device, and responsive to determining that the uplink port 226-2 has the active link status, may determine whether the uplink 226-2 is configured in the management mode in a similar manner as described with reference to uplink 226-1. In an aspect, the FLM 2 may determine, based on a system description associated with a LLDP packet received at the uplink port 226-2, that the uplink port 226-2 is connected to the port P1 of the network switch N1. In an aspect, an LLDP message may not be received at the uplink 226-2, if LLDP messaging is disabled in network switches. If either the uplink 226-2 is determined to be connected to port P1 or an LLDP message is not received at the uplink port 226-2, the FLM 2 may check a VLAN packet counter associated with the uplink port 226-2. The FLM 2 may identify, based on the VLAN packet counter, that VLAN traffic is received at the uplink port 226-2. In an aspect, if a switch receiver VLAN counter associated with the uplink 226-2 is incrementing, the FLM 2 may determine that the uplink 226-2 is receiving VLAN traffic. The switch receiver VLAN counter associated with the uplink port 226-2, in an aspect, may provide information of the total number of VLAN packets received at the uplink 226-2 and the rate at which the VLAN packets are received. However, if the VLAN packet counter associated with uplink 226-2 does not increment, the FLM 2 may determine that no VLAN packet is received at the uplink 226-2. In an aspect, responsive to determining that no VLAN packet is received at the uplink 226-2, the FLM 2 may determine that the uplink 226-2 is properly connected to the port P1 of network switch N1 and both the uplink 226-2 and the port P1 are correctly configured for operation in the management mode.

Typically, when a VLAN packet is received at a switch port, such as the uplink 226-2, while forwarding the VLAN packet to its destination, the switch records the MAC addresses of the source of the VLAN packet in Layer 2 (L2) switch cache. Thus, when a switch port successfully receives and forwards a VLAN packet, a MAC address of the source of the VLAN packet should be stored in a cache memory, such as an L2 cache, associated with the switch port. Responsive to identifying that VLAN traffic is received at the uplink 226-2, the FLM 2 may check whether a MAC address is stored in the L2 cache associated with the uplink 226-2. If one or more MAC addresses are stored in the L2 cache associated with the uplink 226-2, the FLM 2 may determine that the uplink 226-2 is properly connected to the port P1 of network switch N1 and both the uplink 226-2 and the port P1 are correctly configured for operation in the management mode. If no MAC address is stored in the L2 cache associated with the uplink 226-2, the FLM 2 may determine that the VLAN traffic received at the uplink port 226-2 is dropped.

Based on VLAN traffic received at the uplink port being dropped, the FLM 2 may determine that VLAN configuration of one of the uplink port 226-2 and the network switch N1 is incompatible for operation in the management mode. In an aspect, VLAN configuration of the uplink 226-2 includes information indicative of whether the uplink 226-2 is a tagged port or is an untagged port. VLAN packet drop at the uplink port 226-2 may indicate that one of the port P1 of the network switch N1 and/or the uplink 226-2 is configured as a tagged port.

Responsive to determining that VLAN configuration of one of the uplink port 226-2 and the network switch N1 is incompatible for operation in the management mode, the FLM 2 may determine whether the uplink port 226-2 is configured for one of tagged VLAN traffic and untagged VLAN traffic. In an aspect, the FLM 2 may check the configuration of the uplink 226-2 to identify whether the uplink 226-2 is a tagged port or untagged port. Responsive to determining that the uplink port 226-2 is configured for untagged VLAN traffic, the FLM 2 may identify that the port P1 of the network switch N1 is configured for tagged VLAN traffic. Since, the uplink 226-2 is determined to be an untagged port, untagged VLAN traffic form the sending external port (P1 in this case) will be received and forwarded by the uplink 226-2. However, if the external port P1 sends tagged VLAN packets, the untagged uplink 226-2 will ignore such tagged VLAN packets which may result in the VLAN packet drop. This may indicate that the external port P1 is a tagged port while the uplink 226-2 is an untagged port, which may indicate an error in configuration of the port P1 and the uplink 226-2. In such a scenario, although the uplink 226-2 may have an active link, there may not be exchange of traffic between the port P1 and the uplink 226-2 and thus the uplink 226-2 is incompatible for operation in the management mode.

Alternatively, responsive to determining that the uplink 226-2 is configured for tagged VLAN traffic, the FLM 2 identifies that the external uplink (port P1 of the network switch N1 in this case) is configured for tagged VLAN traffic on a first VLAN and the uplink port 226-2 is configured for tagged VLAN traffic on a second VLAN, where the first VLAN is different from the second VLAN. In this case, if the uplink 226-2 is a tagged port and there are VLAN packet drops occurring at the uplink 226-2, it indicates that identical VLAN tags are not allowed on the port P1 and uplink 226-2. This may indicate that the external port P1 and the uplink 226-2 both are tagged to allow traffic from different VLANs, which may indicate an error in configuration of the port P1 and the uplink 226-2. In such a scenario, although the uplink 226-2 may have an active link, there may not be exchange of traffic between the port P1 and the uplink 226-2 and thus the uplink 226-2 is incompatible for operation in the management mode.

Further, responsive to determining that the VLAN configuration of one of the uplink port 226-2 and the network switch N1 is incompatible for operation in the management mode, the FLM 2 may remove the uplink port 226-2 from a group of uplink ports (226-2 to 226-4) available for selection as an active uplink port for the group of frames. In an aspect, the MAC address of the FLM 2 and port number of the uplink port 226-2 may be removed from the registration table from which the owner FLM 4 selects the single active uplink. By removing the uplink 226-2 from the group of uplink ports available for selection as an active uplink port, it is ensured that failure in the uplink 226-2 does not adversely affect connectivity to the group of frames. Further, responsive to removing the uplink port 226-2 from the group of uplink ports which could be potentially selected as the single active uplink, the FLM 2 may send a request to the owner FLM 4 to designate another uplink port from the standby uplink ports, viz., uplinks 226-3 and 226-4, as the active uplink port. In an aspect, the FLM 2 may send a message to the owner FLM 4 indicating that uplink 226-2 is inactive and that one of the standby uplinks (226-3 and 226-4) may be selected as the single active uplink. The method as elaborated above with respect to uplinks 226-1 and 226-2 may also be applicable to the potential uplinks 226-3 and 226-4, prior to one of the uplinks 226-3 and 226-4 being selected as the single active uplink.

Figure 3:
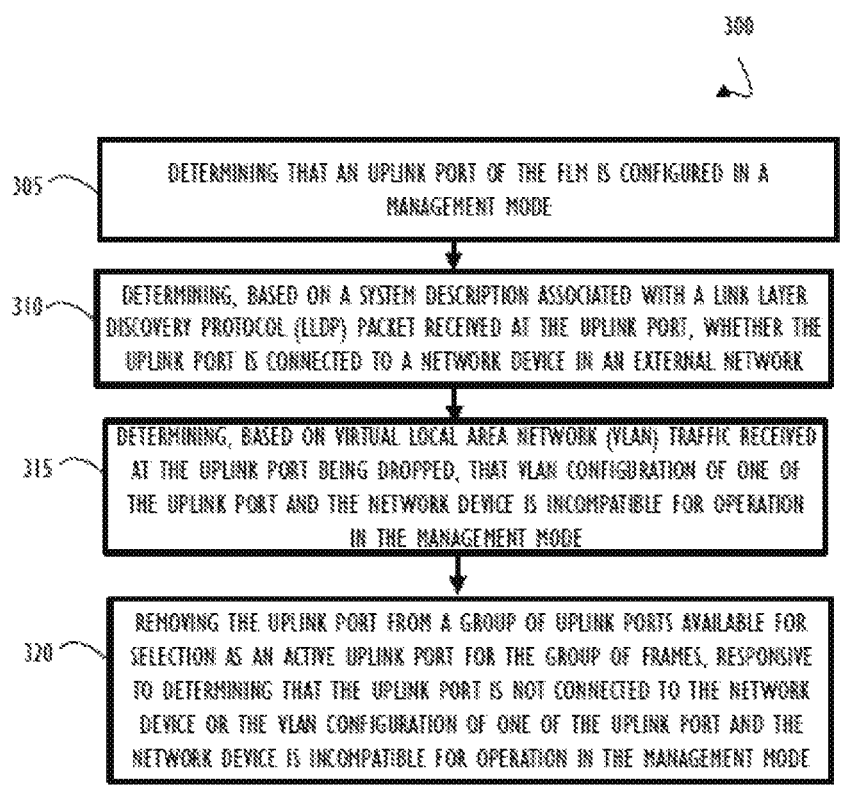
FIG. 3 is a flow diagram of an example method for misconfigured uplink identification.

FIG. 3 represents an example method 300 for detecting a misconfiguration in an uplink and/or a network device (such as a network switch) in an external network connected to the uplink. The method 300 may be performed by an FLM, such as the FLMs 1 to 4, shown in FIGS. 1 and 2. Method 300 may be executed as one or more instructions on a machine (e.g., by at least one processor), where the one or more instructions are included on at least one machine-readable storage medium (e.g., a non-transitory machine readable-storage medium). While only four blocks are shown in method 300, method 300 may include other actions described herein. Additionally, although the blocks are shown in an order, blocks depicted in FIG. 3 may be performed in any order and at any time. Also, some of the blocks shown in method 300 may be omitted without departing from the spirit and scope of this disclosure. Method 300 may be implemented on a network node, such as frame 1 and 2 shown in FIGS. 1 and 2, according to any of the aspects herein.

The method 300 begins with an operational ring network with a ring owner established. Prior to designating an uplink as an active uplink, it may be determined whether the uplink is configured in a management mode, once an active link is available at the uplink, at block 305. Responsive to determining that the uplink is in the management mode, at block 310 it is determined, based on a system description associated with a LLDP packet received at the uplink, whether the uplink port is connected to a network device in an external network. In an aspect, the source device of the LLDP packet is mentioned in the system description. Using the information of the system description, it may be identified that the source device is connected to the uplink. In an aspect, the source device may be a network switch in an external network or an internal hardware component or device installed within the frame.

In response to non-receipt of LLDP packet at the uplink or if it is determined that the uplink is connected to a network device in the external network, it is determined, based on VLAN traffic received at the uplink port being dropped, that VLAN configuration of one of the uplink port and the network device is incompatible for operation in the management mode at block 315. The VLAN configuration of the uplink or the network device may include information indicative of whether the uplink and/or the port of the network switch to which the uplink is connected is configured as a tagged port or an untagged port. Note that for proper operation of the uplink in management mode, the uplink and its connected port on the external switch should be configured as untagged ports.

At block 320, responsive to determining that the uplink port is not connected to the network device or the VLAN configuration of one of the uplink port and the network device is incompatible for operation in the management mode, the uplink port is removed from a group of uplink ports available for selection as an active uplink port for the group of frames. Thus, the incorrectly configured uplink port is made unavailable for selection as the single active uplink, consequently reducing chances of failure of an uplink designated as the single active uplink.

Figure 4:
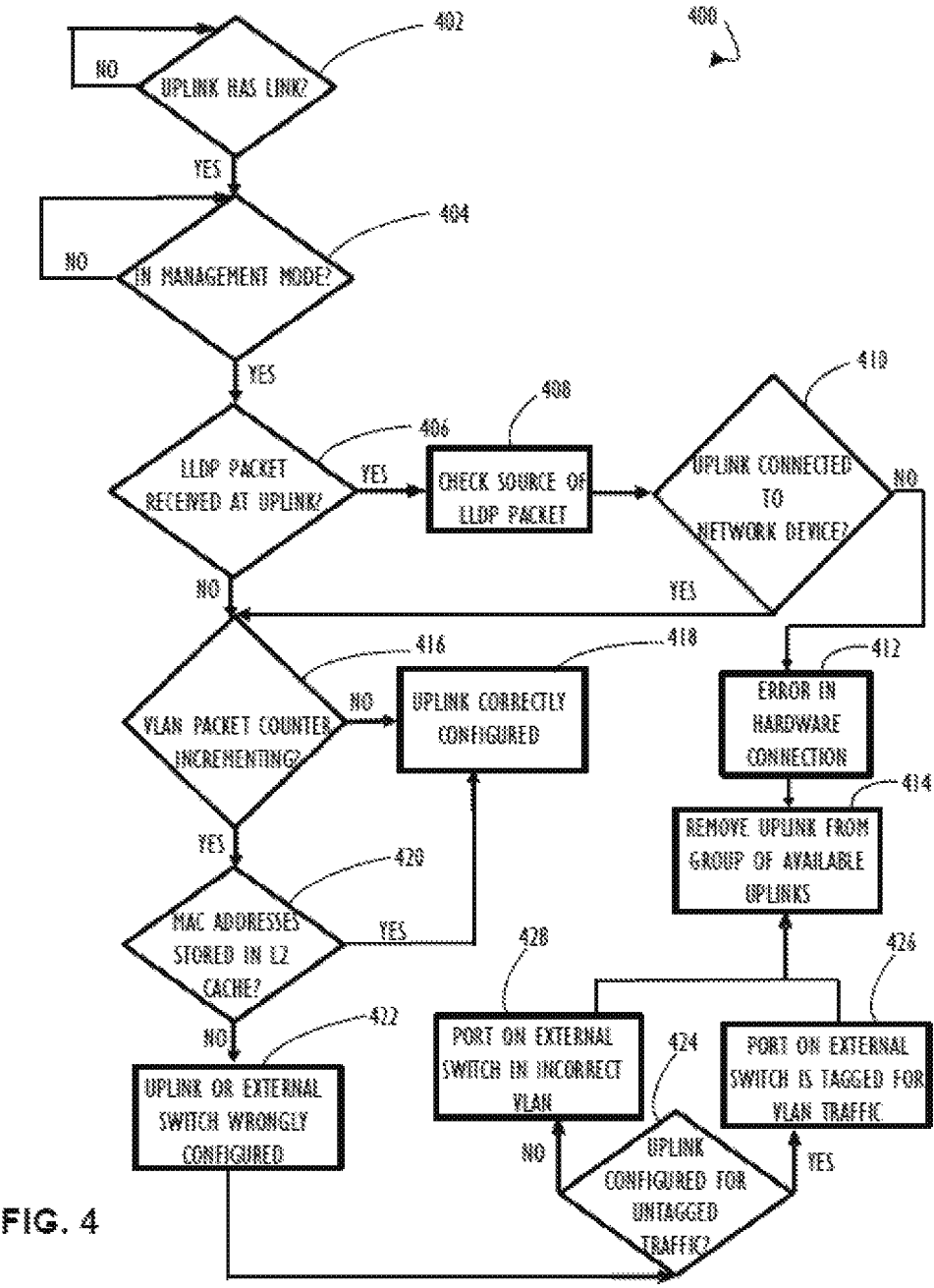
FIG. 4 is a flow diagram of another example method for misconfigured uplink identification.

FIG. 4 represents an example method 400 for detecting a misconfiguration in an uplink and/or a network device (such as switch) in an external network connected to the uplink. The method 400 may be performed by an FLM, such as the FLMs 1 to 4, shown in FIGS. 1 and 2. Method 400 may be executed as one or more instructions on a machine (e.g., by at least one processor), where the one or more instructions are included on at least one machine-readable storage medium (e.g., a non-transitory machine readable-storage medium). Additionally, although the blocks are shown in an order, blocks depicted in FIG. 4 may be performed in any order and at any time. Also, some of the blocks shown in method 400 may be omitted without departing from the spirit and scope of this disclosure. Method 400 may be implemented on a network node, such as frame 1 and 2 shown in FIGS. 1 and 2, according to any of the aspects described herein.

In the method 400, at block 402, an uplink of an FLM, such as the FLM 1 to FLM 4, is checked for presence of an active link status. In an aspect, it is checked whether an uplink of the FLM is connected via a physical cable connection with a port of an external network device. Such an FLM with its uplink connected with the external network device may send status messages to the owner FLM stating that its uplink has an active link status. Alternatively, if the cable is unplugged or there is a failure in the active uplink, the FLM may send a message stating the uplink is inactive.

In response to determining that the uplink has an active link status ("YES" branch from block 402), it is checked whether the uplink is configured in the management mode at block 404. The method 400 is applicable to uplinks configured in management mode. In response to determining that the uplink is in the management mode ("Yes" branch from block 404), it may be checked, at block 406, whether a Link Layer Discovery Protocol (LLDP) packet is received at the uplink. If an LLDP packet is received at the uplink ("YES" branch from block 406) the LLDP packet is analyzed. In an aspect, a system description may be present in the LLDP packet which may indicate a source device from which the LLDP packet has originated. Based on analysis of the system description associated with the LLDP packet, the source device of the LLDP packet may be identified, at block 408. Based on the information in the LLDP packet it may be determined that the uplink is connected to the source device. In an aspect, the source device may be a hardware component installed within the frame. In another aspect, the source device may be a network switch in an external network, such as a customer network. Therefore, using the system description of the LLDP packet received at the uplink port, the FLM may determine whether the uplink port is connected to a network device in an external network, at block 410.

If it is determined that the uplink is not connected to the network device in the external network ("No" branch from block 410), it may be identified that there is an error in hardware connection/cabling of the uplink at block 412.

Thus, it may be identified that there is an error or failure of operation in the uplink and the FLM may send a message stating that its uplink is inactive. The owner FLM, responsive to receiving the message from the FLM that the uplink is inactive, may remove the uplink port from a group of uplink ports available for selection as an active uplink at block 414. Consequently, the uplink wrongly connected to incorrect hardware is prevented from being selected as the single active uplink.

Responsive to determining that the LLDP packet is not received at the uplink ("No" branch from block 406) or that the uplink is connected to a network device in an external network ("Yes" branch from block 410), at block 416, it is checked whether a VLAN packet counter associated with the uplink is incrementing. The FLM may identify based on the VLAN packet counter that VLAN traffic is received at the uplink port. In an aspect, if a switch receiver VLAN counter associated with the uplink is incrementing, the FLM may determine that the uplink is receiving VLAN traffic. Responsive to determining that no VLAN packet is received at the uplink, the FLM may determine that the uplink is properly connected to an external network switch and both the uplink and the external network switch is correctly configured for operation in the management mode, at block 418.

Responsive to identifying that VLAN traffic is received at the uplink ("Yes" branch from block 416), at block 420, it is checked whether a MAC address is stored in the L2 cache associated with the uplink. If one or more MAC addresses are stored in the L2 cache associated with the uplink ("Yes" branch from block 420), it is determined that the uplink is properly connected to a port of a network switch in the external network and both the uplink and the external switch are correctly configured for operation in the management mode. If no MAC address is stored in the L2 cache associated with the uplink ("No" branch from block 420), the FLM may determine that the VLAN traffic received at the uplink port is dropped.

Based on VLAN traffic received at the uplink port being dropped, it may be determined that VLAN configuration of one of the uplink port and the network switch in the external network is incompatible for operation in the management mode. In other words, it is determined that the uplink or the external switch is wrongly configured for operation in the management mode, at block 422. VLAN packet drop at the uplink may indicate that one of a port of a network switch in the external network and/or the uplink is configured as a tagged port.

Responsive to determining that VLAN configuration of one of the uplink and the network switch in the external network is incompatible for operation in the management mode, it is checked whether the uplink is configured for one of tagged VLAN traffic and untagged VLAN traffic, at block 424. In an aspect, the FLM 2 may check the configuration of the uplink to identify whether the uplink is a tagged port or untagged port. Responsive to determining that the uplink is configured for untagged VLAN traffic ("Yes" branch from block 424), it is identified that the port of the network switch in the external network is configured for tagged VLAN traffic, at block 426. Since, the uplink is determined to be an untagged port, untagged VLAN traffic form the sending external port will be received and forwarded by the uplink. However, if the external port sends tagged VLAN packets, the untagged uplink will ignore such tagged VLAN packets which may result in the VLAN packet drop. This means that the external port P1 being a tagged port while the uplink being an untagged port indicates an error in configuration of the port in the external switch and the uplink. In such a scenario, although the uplink may have an active link, there may not be exchange of traffic between the port of the network switch in the external network and the uplink and thus the uplink is incompatible for operation in the management mode.

Alternatively, responsive to determining that the uplink is configured for tagged VLAN traffic ("No" branch from block 424), it is identified that the port of the network switch in the external network is configured for tagged VLAN traffic on a first VLAN, whereas, the uplink is configured for tagged VLAN traffic on a second VLAN, where the first VLAN is different from the second VLAN. In this case, if the uplink is a tagged port and there are VLAN packet drops occurring at the uplink, it indicates that identical VLAN tags are not allowed on the port in the external switch and the uplink. This means that the external port of the external network switch and the uplink both are tagged to different VLANs, which indicates an error in configuration of the port of the external switch and the uplink, at block 428, In such a scenario, although the uplink may have an active link, there may not be exchange of traffic between the port of the external switch and the uplink and thus the uplink is incompatible for operation in the management mode.

Further, responsive to determining that the VLAN configuration of one of the uplink port and the network switch is incompatible for operation in the management mode, the uplink may be removed from a group of uplinks available for selection as an active uplink port, at block 414. By removing the misconfigured uplink from the group of uplink ports available for selection as an active uplink port, it is ensured that failure in the uplink does not adversely affect connectivity to the group of frames.

Figure 5:
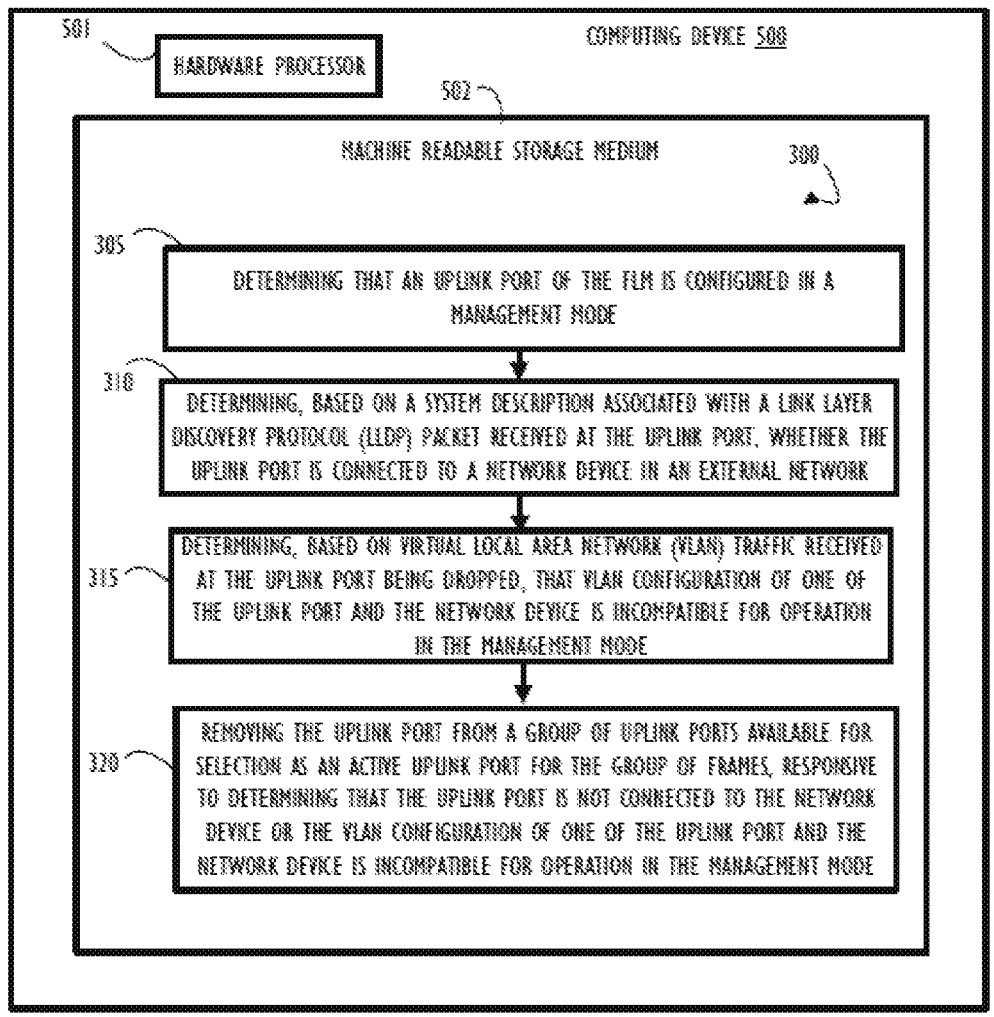
FIG. 5 illustrates an example computing device instrumented with computer instructions in which various examples described herein may be implemented for misconfigured uplink identification.

FIG. 5 is an example computing device 500, with a hardware processor 501, and accessible machine-readable instructions stored on a machine-readable medium 502 for implementing one example temporally aware procurement/deployment system, according to one or more disclosed example implementations. In an example, the computing device 500 may be a network node, such as an FLM, connected with other network nodes in a ring network. The network node may include an uplink port to send and receive messages in an external network. FIG. 5 illustrates computing device 500 configured to perform the flow of method 300 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 305-320 discussed above with reference to FIG. 3.

A processing element such as processor 501 may contain one or more hardware processors, where each hardware processor may have a single or multiple processor cores. In one embodiment, the processor 501 may include at least one shared cache that stores data (e.g., computing instructions) that are utilized by one or more other components of processor 501. For example, the shared cache may be a locally cached data stored in a memory for faster access by components of the processing elements that make up processor 501. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 5, the processing elements that make up processor 501 may also include one or more of other types of hardware processing components, such as graphics processing units (GPU), application specific integrated circuits (ASICs), field-programmable gate arrays (FPGAs), and/or digital signal processors (DSPs).

The processor 501 may be operatively and communicatively coupled to a memory. The memory may be a non-transitory computer readable medium, such as the machine readable storage medium 502, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

The invention claimed is:

1. A method comprising:
   determining, by a Frame Link Module (FLM) in a frame belonging to a group of frames connected in a ring network, that an uplink port of the FLM is configured in a management mode;

responsive to determining that the uplink port is configured in the management mode;

determining, by the FLM and based on a system description associated with a Link Layer Discovery Protocol (LLDP) packet received at the uplink port, whether the uplink port is connected to a network device in an external network;

determining, by the FLM and based on Virtual Local Area Network (VLAN) traffic received at the uplink port being dropped, that VLAN configuration of one of the uplink port and the network device is incompatible for operation in the management mode; and responsive to determining that the uplink port is not connected to the network device or that the VLAN configuration of one of the uplink port and the network device is incompatible for operation in the management mode, removing, by the FLM, the uplink port from a group of uplink ports available for selection as an active uplink port for the group of frames.

2. The method of claim 1, wherein, determining whether the uplink port is connected to the network device in the external network comprises:

identifying, based on analysis of the system description associated with the LLDP packet, a source device from which the LLDP packet has originated; and determining that the uplink port is connected to the source device.

3. The method of claim 1, comprising:

identifying, based on a VLAN packet counter associated with the uplink port, that VLAN traffic is received at the uplink port; and responsive to identifying that VLAN traffic is received, determining, based on no MAC address being stored in a Layer 2 cache associated with the uplink port, that the VLAN traffic received at the uplink port is dropped.

4. The method of claim 1, wherein, responsive to determining that VLAN configuration of one of the uplink port and the network device is incompatible for operation in the management mode, the method comprises:

determining whether the uplink port is configured for one of tagged VLAN traffic and untagged VLAN traffic;

responsive to determining that the uplink port is configured for untagged VLAN traffic, identifying that an external uplink in the network device is configured for lagged VLAN traffic; and responsive to determining that the uplink port is configured for tagged VLAN traffic, identifying that the external uplink is configured for tagged VLAN traffic on a first VLAN and the uplink port is configured for tagged VLAN traffic on a second VLAN, wherein the first VLAN is different from the second VLAN.

5. The method of claim 1, comprising, responsive to removing the uplink port from the group of uplink ports, sending a request to an owner FLM to designate another uplink port from the group of uplink ports as the active uplink port.

6. The method of claim 1, comprising:

prior to determining that the uplink port is in the management mode, checking whether the uplink port has an active link status.

7. The method of claim 1, wherein the frame includes a scalable compute resource.

8. A network node in a ring network, the network node comprising:

a processor;

an uplink port to send and receive messages in an external network; and a memory coupled to the processor, the memory storing instructions executable by the processor to:

determine that the uplink port of the FLM is configured in a management mode;

responsive to determining that the uplink port is configured in the management mode;

determine, based on a system description associated with a Link Layer Discovery Protocol (LLDP) packet received at the uplink port, whether the uplink port is connected to a network device in the external network;

determine, based on Virtual Local Area Network (VLAN) traffic received at the uplink port being dropped, that VLAN configuration of one of the uplink port and the network device is incompatible for operation in the management mode; and responsive to determining that the uplink port is not connected to the network device or that the VLAN configuration of one of the uplink port and the network device is incompatible for operation in the management mode, remove the uplink port from a group of uplink ports available for selection as an active uplink port for the group of frames.

9. The network node of claim 8, wherein the network node is disposed within a frame of a scalable compute resource.

10. The network node of claim 8, wherein, to determine whether the uplink port is connected to the network device in the external network, the processor is to:

identify, based on analysis of the system description associated with the LLDP packet, a source device from which the LLDP packet has originated; and determine that the uplink port is connected to the source device.

11. The network node of claim 8, wherein, the processor is to:

identify, based on a VLAN packet counter associated with the uplink port, that VLAN traffic is received at the uplink port; and responsive to identifying that VLAN traffic is received, determine, based on no MAC address being stored in a Layer 2 cache associated with the uplink port, that the VLAN traffic received at the uplink port is dropped.

12. The network node of claim 8, wherein, responsive to determining that VLAN configuration of one of the uplink port and the network device is incompatible for operation in the management mode, the processor is to:

determine whether the uplink port is configured for one of tagged VLAN traffic and untagged VLAN traffic;

responsive to determining that the uplink port is configured for untagged VLAN traffic, identify that an external uplink in the network device is configured for tagged VLAN traffic; and responsive to determining that the uplink port is configured for tagged VLAN traffic, identify that the external uplink is configured for tagged VLAN traffic on a first VLAN and the uplink port is configured for tagged VLAN traffic on a second VLAN, wherein the first VLAN is different from the second VLAN.

13. The network node of claim 8, wherein, responsive to removing the uplink port from the group of uplink ports, the processor sends a request to an owner FLM to designate another uplink port from the group of uplink ports as the active uplink port.

14. The network node of claim 8, wherein, the processor is further to:

prior to determining that the uplink port is in the management mode, check whether the uplink port has an active link status.

15. A non-transitory computer readable medium comprising computer executable instructions that, when executed by one or more processing units, cause the one or more processing units to:
- determine that an uplink port of a Frame Link Module (FLM) in a frame from a group of frames connected in a ring network is configured in a management mode;
- responsive to determining that the uplink port is configured in the management mode;
- determine, based on a system description associated with a Link Layer Discovery Protocol (LLDP) packet received at the uplink port, whether the uplink port is connected to a network device in the external network;
- determine, based on Virtual Local Area Network (VLAN) traffic received at the uplink port being dropped, that VLAN configuration of one of the uplink port and the network device is incompatible for operation in the management mode; and
- responsive to determining that the uplink port is not connected to the network device or that the VLAN configuration of one of the uplink port and the network device is incompatible for operation in the management mode, remove the uplink port from a group of uplink ports available for selection as an active uplink port for the group of frames.

16. The non-transitory computer readable medium of claim 15, wherein the instructions to determine whether the uplink port is connected to the network device in the externa network, when executed by one or more processing units, cause the one or more processing units to:
- identify, based on analysis of the system description associated with the LLDP packet, a source device from which the LLDP packet has originated; and determine that the uplink port is connected to the source device.

17. The non-transitory computer readable medium of claim 15, wherein the instructions when executed by one or more processing units, cause the one or more processing units to:
- identify, based on a VLAN packet counter associated with the uplink port, that VLAN traffic is received at the uplink port; and
- responsive to identifying that VLAN traffic is received, determine, based on no MAC address being stored in a Layer 2 cache associated with the uplink port, that the VLAN traffic received at the uplink port is dropped.

18. The non-transitory computer readable medium of claim 17, wherein, responsive to determining that VLAN configuration of one of the uplink port and the network device is incompatible for operation in the management mode, the instructions when executed by one or more processing units, cause the one or more processing units to:
- determine whether the uplink port is configured for one of tagged VLAN traffic and untagged VLAN traffic;
- responsive to determining that the uplink port is configured for untagged VLAN traffic, identify that an external uplink in the network device is configured for fagged VLAN traffic; and
- responsive to determining that the uplink port is configured for tagged VLAN traffic, identify that the external uplink is configured for tagged VLAN traffic on a first VLAN and the uplink port is configured for tagged VLAN traffic on a second VLAN, wherein the first VLAN is different from the second VLAN.

19. The non-transitory computer readable medium of claim 15, wherein, responsive to removing the uplink port from the group of uplink ports, the instructions when executed by one or more processing units, cause the one or more processing units to:
- send a request to an owner FLM to designate another uplink port from the group of uplink ports as the active uplink port.

20. The non-transitory computer readable medium of claim 15, wherein the instructions when executed by one or more processing units, cause the one or more processing units to:
- prior to determining that the uplink port is in the management mode, check whether the uplink port has an active link status.

* * * * *